United States Patent [19]

Jacobson

[11] Patent Number: 4,783,129
[45] Date of Patent: Nov. 8, 1988

[54] HAZARDOUS WASTE GLOVE BAG REMOVAL SYSTEM

[76] Inventor: Earl B. Jacobson, 510 S. Shore Dr., Crystal Lake, Ill. 60014

[21] Appl. No.: 1,074

[22] Filed: Jan. 7, 1987

[51] Int. Cl.⁴ .................................................. A61G 11/00
[52] U.S. Cl. .................................................. 312/1; 312/3
[58] Field of Search ................... 312/1, 3; 15/227; 174/48

[56] References Cited

U.S. PATENT DOCUMENTS 4,626,291  12/1986  Natale .................................. 15/227

FOREIGN PATENT DOCUMENTS 1567270  2/1978  United Kingdom ................... 321/1

8605431  9/1986  World Int. Prop. O. .

Primary Examiner—Joseph Falk
Attorney, Agent, or Firm—Silverman, Cass, Singer & Winburn, Ltd.

[57] ABSTRACT

An improved glove bag hazardous waste removal system especially for confining pipes, including a top endless zipper for closing the bag onto the pipes and shoulder extensions with self retained shoulder straps for securing and removing the bag to and from the pipes. At least one self-sealing access sleeve is included in the bag wall for contamination free access to the interior thereof by water spray and vacuum probes. An internal self-closing tool pouch is formed on an inner bag wall. The bag preferably made of PVC, can include an internally sealable waste catch basin.

17 Claims, 1 Drawing Sheet

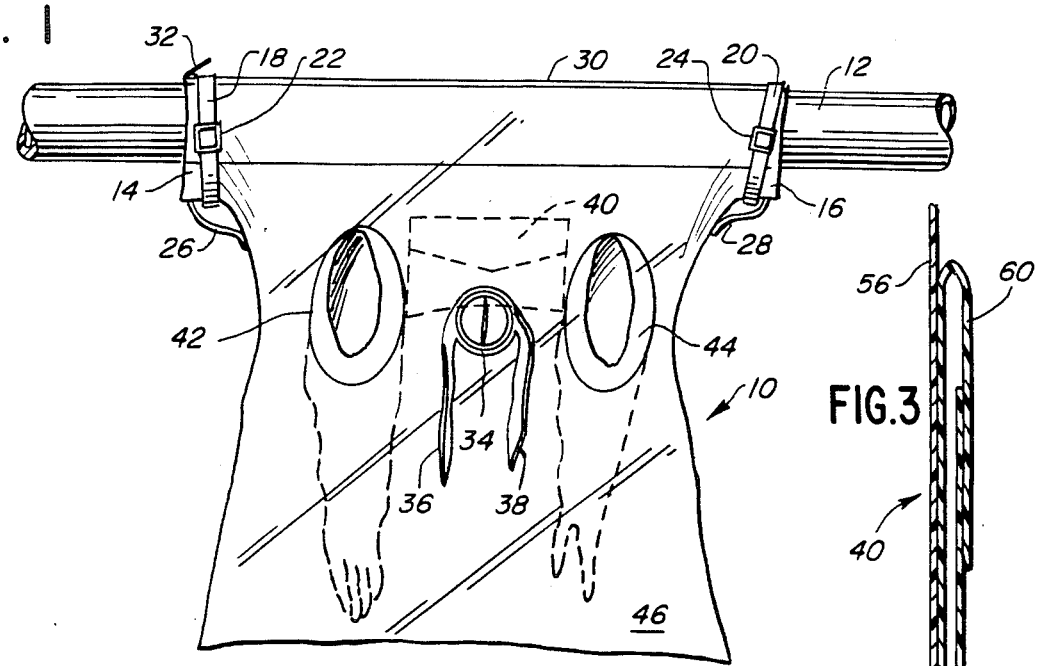
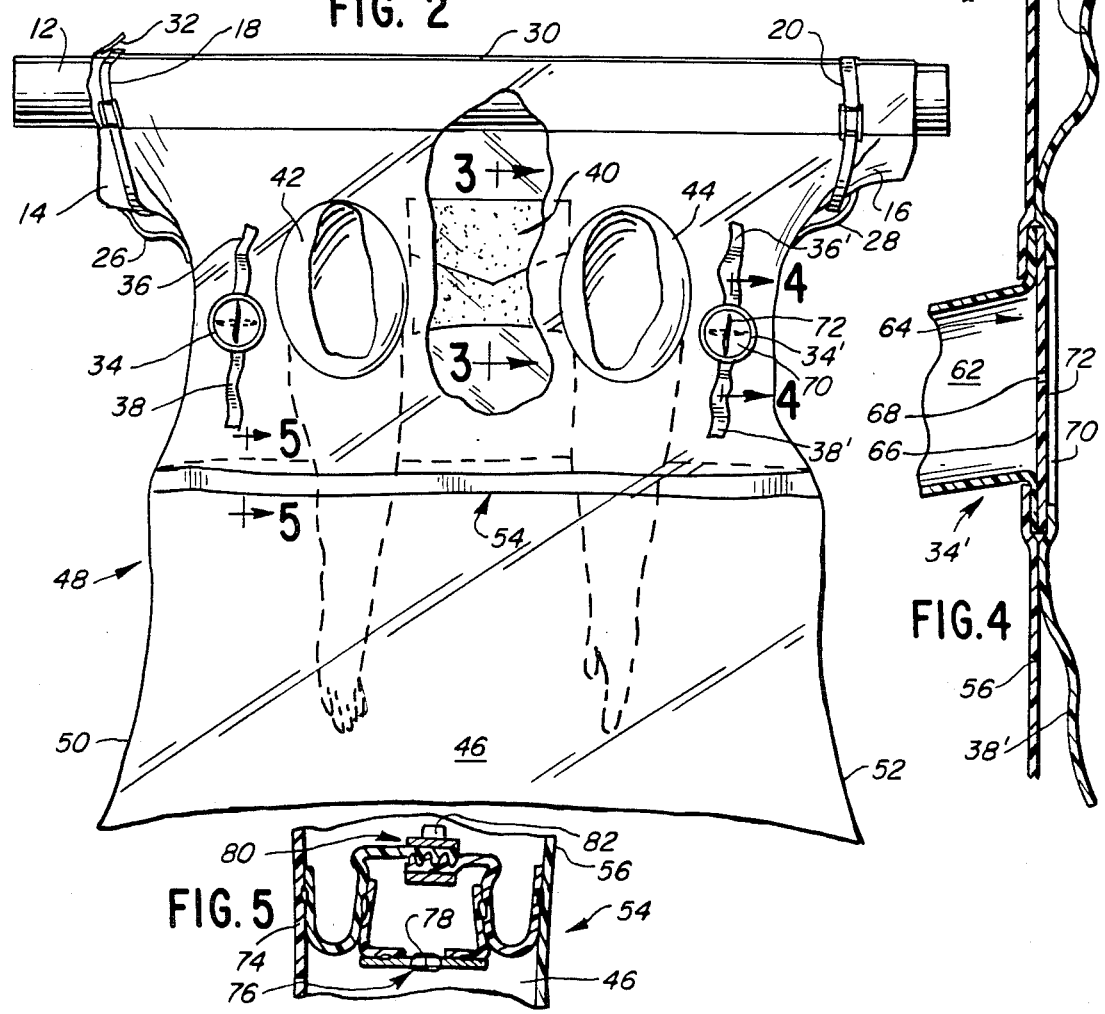

HAZARDOUS WASTE GLOVE BAG REMOVAL SYSTEM

BACKGROUND OF THE INVENTION

The invention relates generally to hazardous waste removal systems and more particularly to an improved glove bag removal system for removing hazardous wastes, such as asbestos, in a defined area.

Numerous prior art glove bag waste removal systems have been utilized for a considerable period of time for removing waste from a closely defined work area in which the contaminants or hazardous wastes are confined. The worker is protected from the wastes since the wastes are confined inside of the system and the worker works in the system but avoids direct contact with the wastes by utilizing the well-known glove bag concept.

One particular application for glove bag waste removal systems is in removing coatings or insulation from pipes which material is or contains asbestos. The prior art glove bags are secured and sealed around the pipes at the tops of the bags, such as by wrapping the open ends of the bag top around the pipe and taping the openings shut. The bags are utilized to remove the asbestos matertial and are then removed from the pipe and sealed for disposal. Typically, the bags are placed in a second bag for disposal.

The bags frequently are made from polymers, which do not give sufficient strength in all uses. Also, the polymer bags have a bottom seal which can rupture. Wrapping and upwrapping the tops of the bag onto and from the pipe can cause a poor seal or release of the asbestos materials from the bag. The bags are utilized under negative pressure and typically include one or more openings for vacuum lines and for water spray lines or nozzles for wetting down the material as an extra safety precaution. These openings can be the cause of additional asbestos leaks. The bags often also contain an internal tool pouch, which generally is open at the top which catches the waste.

Another somewhat related glove bag waste removal system and application is disclosed in U.S. application Ser. No. 1,075, entitled "Glove Bag Waste Removal System For Asbestos Impregnated Brakes", filed concurrently herewith, the disclosure of which is incorporated herein by reference.

SUMMARY OF THE INVENTION

The above and other disadvantages of prior art hazardous waste glove bag removal systems and techniques are overcome in accordance with the present invention by providing an improved hazardous waste bag, which easily is mounted and removed from pipes while protecting the worker from release of the hazardous materials.

The bag includes at least one self-sealing access sleeve for contamination free access to the interior of the bag by vacuum or water spray probes. The bag includes a top endless zipper which accomodates one or more zipper slides and easily can accomodate valve structures and cross pipes. The bag includes shoulder extentions with retained securing straps for securing the bag in place on the pipe and completing the sealing thereof.

The bag has an internal self-closing tool pouch to avoid water and waste entry therein. The bag preferably is made from heavy gauge, optically clear, polyvinyl (PVC) material. The bag optionally can contain an internally sealable waste catch basin.

BRIEF DESCRIPTION OF THE DRAWINGS

FIG. 1 is a perspective view of a pipe with a first embodiment of the improved glove bag hazardous waste removal system of the invention mounted thereon;

FIG. 2 is a perspective view of a pipe with a second embodiment of the improved glove bag hazardous waste removal system of the invention mounted thereon;

FIG. 3 is a side sectional view of the self-closing tool pouch of the invention taken along the lines 3—3 in FIG. 2;

FIG. 4 is a partial side sectional view of the self-sealing access sleeve of the invention taken along the lines 4—4 of FIG. 2; and FIG. 5 is a partial side sectional view of the internally sealable waste catch basin of the invention taken along the line 5—5 of FIG. 2.

DESCRIPTION OF THE PREFERRED EMBODIMENTS

Referring to FIG. 1, a first embodiment of the improved glove bag hazardous waste removal system of the invention is designated generally by the reference character 10. The bag 10 is illustrated mounted onto a pipe 12, which pipe generally will have a hazardous material, most generally asbestos, covering thereon, such as for insulation. It can be desirable to move the bag 10 along the pipe 12 for repairing the pipe 12 or to remove the hazardous waste/insulation therefrom.

To facilitate the installation, sliding and removal of the bag 10 on or from the pipe 12, the bag includes a pair of shoulder extensions 14 and 16. The shoulder extensions 14 and 16 preferably include respective heavy duty straps 18 and 20 with respective securing buckles 22 and 24 for securing the extensions 14 and 16 and hence the bag 10 to the pipe 12 in any desired location. Further, to aid in the self containment of the bag system 10, the straps 18 and 20 are retained on the extensions 18 and 20 and hence the bag 10 by respective belt loops 26 and 28 formed integrally with the bag 10.

The bag 10 preferably is formed from a heavy gauge, optically clear PVC material to aid the worker in seeing into the bag 10 and further to have sufficient strength and body to hold the waste in the bag 10 and to form the extensions 14 and 16.

To further aid in the easy mounting and demounting of the bag 10, the bag 10 includes an endless top zipper 30, which includes one or more zipper pulls 32. The endless zipper 30 is closed to secure and seal the bag 10 to the pipe 12. The zipper 30 can include one or more sealing flaps (not illustrated) to ensure no leakage of the hazardous waste therethrough. The endless zipper 30 can accomodate valves or cross pipes (not illustrated) merely by utilizing a pull on each side of the valve or cross pipe. Tape additionally can be utilized if desired or necessary due to the particular structure upon which the bag 10 is mounted.

Once the bag 10 is secured to the pipe 12, in the proper location, the worker generally will insert a water spray probe (not illustrated) into the interior of the bag 10 to wet down the pipe 12 and hazardous material thereon. The probe is inserted and removed through a self-sealing access sleeve 34 to avoid the release of contaminants. A negative pressure or vacuum probe (not illustrated) then is inserted into the bag 10, also through the access sleeve 34. The access sleeve 34 includes a pair of ties or tabs 36, 38 which are utilized to secure the vacuum probe in the bag 10. The details of the sleeve 34 will be more fully described with respect to FIG. 4.

The worker will have placed the necessary tools (not illustrated) into a self-closing tool pouch 40, the details of which are more fully illustrated with respect to FIG. 3. The worker will manipulate the spray probe and grasp the tools to work on the pipe 12 by utilizing a pair of glove sleeves 42 and 44, which allow the worker free access to the interior of the bag 10 without releasing any contaminants therefrom. The glove sleeves 42 and 44 can include respective rigid cuffs 43 and 45, preferably made from plastic, PVC or metal materials. The cuffs 43 and 45 can be secured, welded or otherwise sealingly attached to the sleeves 42 and 44. This keeps the glove portions open for easy access and allows the glove portions to be separate replaceable parts.

Once the repair or removal operation is completed, the waste and water being retained in a bottom portion 46 of the bag 10, the worker removes the bag 10 from the pipe 12 for sealing and disposal. The portion 46, being formed from PVC material, does not have a bottom seal and hence does not have a tendency to rupture. The worker will remove the tools from the self-closing pouch 40, which has remained closed avoiding the trapping of water and contaminants therein.

A second embodiment of the improved glove bag hazardous waste removal system of the invention is designated generally by the reference character 48, mounted onto the pipe 12. Identical numerals are utilized for the same structure as that utilized with the bag 10. The bag 48 includes a pair of generally identical access sleeves 34 & 34', with respective ties 36, 38 and 36', 38'. The bag 48 therefore, can accomodate more than one probe at a time, such as the spray probe inserted and secured into the access sleeve 34 and the vacuum probe inserted and secured into the access sleeve 34'. The vacuum probe maintains the interior of the bag at a negative pressure in a conventional manner to ensure that the airborne contaminants are captured and removed by the vacuum probe, which is connected to a conventional filter unit (also not illustrated).

By forming the bag 48 (and 10) from PVC material, the bags 10 and 48 have sufficient strength and body to also accomodate a larger bottom or waste catch basin 46. Respective sides or ends 50 and 52 can be formed to flare out to accomodate a greater amount of waste.

Further, the bag 48 includes a sealing assembly 54, which can be utilized to completely seal in the accumulated hazardous waste and water prior to removing the bag 48 from the pipe 12. The details of the sealing assembly are best illustrated with respect to the description of FIG. 5.

Referring now to FIG. 3, the pouch 40 is formed in or on a first wall 56 of the bag 48. The self-closing pouch 40 can be formed from a separate piece of PVC material and then electronically welded to the wall 56. In a like manner, each of the seams of the bags 10 and 48 preferably are heat sealed or welded electronically. The tool pouch 40 includes a first bottom pocket 58 and includes a top flap 60 folded over the pocket 58 and formed preferably integrally therewith. The worker easily can access the tools in the pouch 58 and when the pouch 58 is not being accessed, the flap 60 will self-close the pouch 58. In this manner water or other waste material passing downward inside the bag 10 or 48 will not enter into the pouch 58 and hence will not further contaminate the pouch 58 and the tools therein and thus will not cause the release of further waste when the tools are later removed.

The penetration self-sealing access sleeve 34' is best illustrated in FIG. 4. The sleeve 34' includes a tapered inner tube 62 which open into the bag 48 and is tapered to form a seal with the probe inserted therein. The tube 62 is welded to the wall 56. The sleeve 34' has a cross seal structure 64, which ensures the self-sealing of the sleeve 34' to avoid contaminants escaping therethrough. The structure 64 includes a first flexible diaphragm 66 having a first cross slit 68 therein. A second flexible diaphragm 70 has a second cross slit 72 therein and the structure 64 is welded to the wall 56 and the sleeve 34' along with the ends of the tubes 36' and 38'. The cross slits 68 and 72 are oriented orthogonal to and preferably perpendicular to one another.

The sealing assembly 54 is best illustrated with respect to FIG. 5. The sealing assembly 54 is welded on one side to the wall 56 and on the opposite side to a second or back wall 74 of the bag 48. The assembly 54 includes a lower spiral zipper assembly 76, which is closed to pull the two walls 56 and 74 together to enclose the waste catch basin 46. The bottoms or glove portions of the glove sleeves 42 and 44 are of course utilized to close the zipper 76 by manipulating one or more slides 78. The glove sleeves 42 and 44 are thus outside of the sealed basin 46.

To complete the sealing of the basin 46, a second so-called zip-lock zipper assembly 80 is sealed by manipulating a zipper slide 82. The assembly 80 preferably also is formed from PVC material which completely seals the basin 46. The bag 48 then can be removed from the pipe 12 and the tools removed from the closed pouch 40, without releasing any contaminants from the sealed catch basin 46.

Many modifications and variations of the present invention are possible in light of the above teachings. Clearly the size, shape and spacing of the bag and openings therein can be varied depending upon the application. It is, therefore, to be understood that within the scope of the appended claims, the invention may be practiced otherwise than as specifically described.

What is claimed and desired to be secured by Letters Patent of the United States is:

1. An improved glove bag hazardous waste removal system, adapted to be mounted onto and removed from pipes, comprising:
   a containment bag having at least one glove sleeve therein and an open top securable to a pipe by zipper means sealed to said open top for closing said top onto said pipe by manipulating at least one zipper slide thereof; and
   said bag having at least one self-sealing access sleeve means for allowing penetration of said bag by probes such as spray and/or vacuum probes inserted therethrough, while preventing waste from exiting said bag, said access means including diaphragm means having respective cross slits with a point of intersection therebetween, for forming said self-sealing access means.

2. The system as defined in claim 1 wherein said bag further includes a self-closing tool pouch formed on an inner wall of said bag and accessable by said glove sleeve for preventing waste from accumulating therein, said pouch including a top flap for preventing wastes from entering said tool pouch.

3. The system as defined in claim 1 wherein said bag further includes shoulder extensions at outer ends of said bag and formed coextensive with said open top and endless zipper means, said shoulder extensions including means for securing said extensions to the pipe.

4. The system as defined in claim 3 wherein said securing means include adjustable straps secured to said extensions for securing said extensions to the pipe.

5. The system as defined in claim 1 wherein said self-sealing access sleeve means include an inner tube extending into said bag from said diaphragm means and a pair of retaining tabs or ties secured thereto.

6. The system as defined in claim 1 wherein said bag includes at least a pair of said glove sleeves and a pair of self-sealing access sleeve means therein.

7. The system as defined in claim 1 wherein said bag includes means for forming an internally sealable waste catch basin therein.

8. The system as defined in claim 7 wherein said forming means include at least a first zipper means for sealing the walls of said bag to one another to form said waste catch basin.

9. The system as defined in claim 8 further including a second zip lock type zipper means for further sealing said waste catch basin above said first zipper means.

10. The system as defined in claim 9 wherein said bag includes at least a pair of said glove sleeves and a pair of self-sealing access sleeve means therein, said glove sleeves being outside of said waste catch basin.

11. An improved glove bag hazardous waste removal system, adapted to be mounted onto and removed from pipes, comprising:

a containment bag having at least one glove sleeve therein and an open top securable to the pipe by zipper means sealed to said open top for closing said top onto said pipe by manipulating at least one zipper slide thereof;

said bag having at least one self-sealing access sleeve means for allowing penetration of said bag by probes inserted therethrough, while preventing waste from exiting said bag;

shoulder extensions at outer ends of said bag and formed coextensive with said open top and zipper means, said shoulder extensions including means for securing said extensions to the pipe; and means for forming an internally sealable waste catch basin, said forming means include a first spiral zipper means for sealing the opposing walls of said bag to one another to form said waste catch basin and including second zip lock type zipper means sealing opposing walls for further sealing said waste catch basin above said first zipper means.

12. The system as defined in claim 11 wherein said bag further includes a self-closing tool pouch formed on an inner wall of said bag and accessible by said glove sleeve for preventing waste from accumulating therein, said pouch including a top flap for preventing waste from entering said tool pouch.

13. The system as defined in claim 11 wherein said securing means includes adjustable straps secured to said extensions for securing said extensions to the pipe.

14. The system as defined in claim 11 wherein said self-sealing access sleeve means include an inner tube extending into said bag, sealed by diaphragm means having a pair of diaphragms abutting one another, each having respective cross slits with a point of intersection therebetween, for forming said self-sealing access means and a pair of retaining tabs or ties secured thereto.

15. The system as defined in claim 11 wherein said bag includes at least a pair of said glove sleeves and a pair of self-sealing access sleeve means therein.

16. The system as defined in claim 11 further including a second zip lock type zipper means for further sealing said waste catch basin above said first zipper means.

17. The system as defined in claim 11 wherein said bag includes at least a pair of said glove sleeves and a pair of self-sealing access sleeve means therein, said glove sleeves being outside of said waste catch basin.

* * * * *